May 19, 1931.  H. A. S. HOWARTH  1,806,062
BEARING
Filed Dec. 21, 1928

Inventor
Harry A. S. Howarth.
By
Cameron, Kerkam and Sutton.
Attorneys

Patented May 19, 1931

1,806,062

UNITED STATES PATENT OFFICE

HARRY A. S. HOWARTH, OF FRANKFORD, PENNSYLVANIA, ASSIGNOR TO KINGSBURY MACHINE WORKS, INC., OF FRANKFORD, PHILADELPHIA, PENNSYLVANIA, A CORPORATION OF DELAWARE

BEARING

Original application filed April 12, 1927, Serial No. 183,135. Divided and this application filed December 21, 1928. Serial No. 327,666.

This invention relates to bearings, and more particularly to combined thrust and steady bearings. This application is a division of application Serial No. 183,135, filed April 12, 1927, by the present applicant.

It has heretofore been the practice, in combined thrust and steady bearings, to support the steady bearing in one way or another from the pot or housing which surrounds the thrust bearing. This has necessitated that the mounting for the steady bearing be dependent upon the size and shape of said pot or housing, and inasmuch as the size and shape of the latter vary within wide limits depending upon the service to which the bearing is put, the character of oil cooling employed, the size and speed of the bearing, etc., and as it is also common for the pot or housing to be furnished by a different manufacturer from that of the thrust bearing and the steady bearing, it has been impossible to standardize steady bearing supports with the thrust bearings with which they are associated.

One object of this invention is to provide a novel combined thrust and steady bearing wherein the support for the steady bearing is entirely independent of the size and shape of the pot or bearing housing, but is determined by the size of the thrust bearing, so that the steady bearing support may be standardized, and the thrust bearing and the steady bearing may be furnished as a unit by the bearing manufacturer.

Another object of this invention is to provide a novel combined thrust and steady bearing as herein characterized wherein the lubrication of the steady bearing is effected from the oil provided for lubricating the thrust bearing.

Another object of this invention is to provide a combined thrust and steady bearing with novel arrangements for effecting the lubrication of the steady bearing from the oil provided for the lubrication of the thrust bearing and wherein the means for effecting such lubrication may be variously disposed with respect to the steady bearing and the thrust bearing.

Another object of this invention is to provide a combined thrust and steady bearing in which the thrust and steady bearing elements are associated in unitary relationship and in which the steady bearing may be within or below the thrust bearing as well as above the same.

Another object of this invention is to provide a combined thrust and steady bearing with novel arrangements for effecting the lubrication of the steady bearing from the oil provided for the lubrication of the thrust bearing and embodying a compound oil reservoir, one element of which acts as an expansion tank for the other element.

Another object of this invention is to provide a compound oil reservoir for a lubricating system in which one element acts as a cooling housing for the oil and is kept at a constant level, and the other element acts as an expansion tank for the former.

Another object of this invention is to provide a combined thrust and steady bearing which enables the use of a stationary thrust collar.

This invention is capable of receiving a variety of mechanical expressions, several of which are shown on the accompanying drawings, but it is to be expressly understood that the drawings are for purposes of illustration only and is not to be construed as a definition of the limits of the invention, reference being had to the appended claims for that purpose.

Referring to the drawings, wherein the same reference characters are employed to designate corresponding parts in the several figures.

Figures 1, 2, 3:
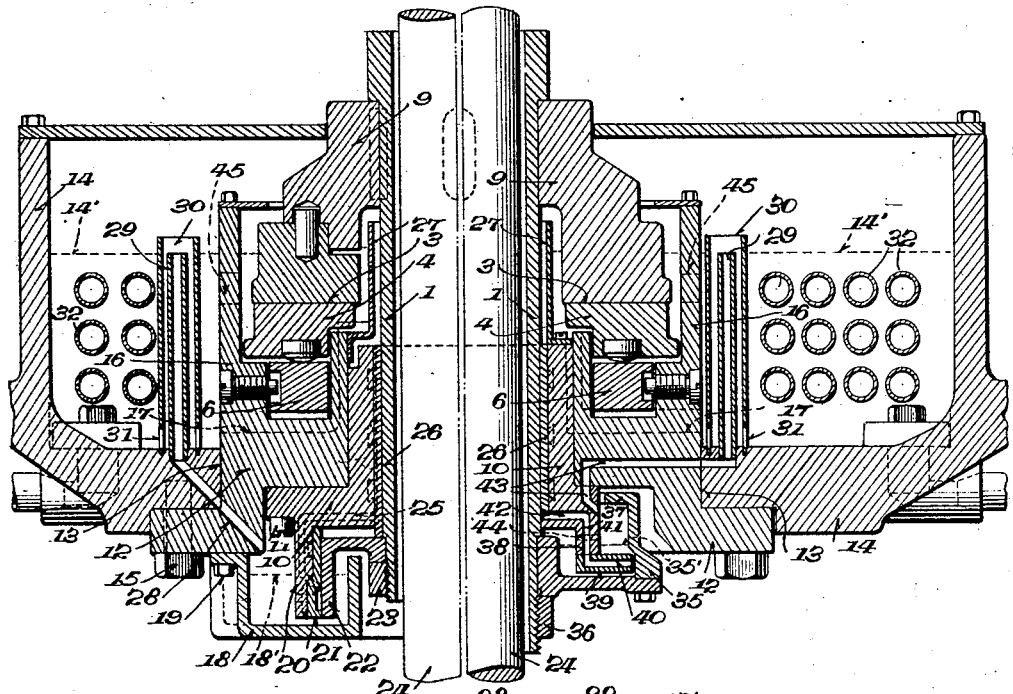
Fig. 1 is a half-axial section of a combined thrust and steady bearing embodying the present invention.
Fig. 2 is a half-axial section of another embodiment of the present invention.
Fig. 3 is an axial section of another embodiment of the present invention employing a stationary thrust collar.

In the form of the invention illustrated in Fig. 1 of the drawings, a hollow shaft 1 carries in any suitable way a rotatable thrust member 9 having a bearing surface 3 which cooperates with a stationary thrust member 4 of any suitable form. A shell 10 of a steady bearing 26 is within and below the elements of the thrust bearing and is suitably attached, as by bolts or screws 11, to a support 12, which is shown as inserted in an aperture 13 in the pot or housing 14 and suitably attached thereto as by bolts or screws 15. Support 12 is here shown as connected to or integrally formed with a ring 16 which receives the equalizing plates 6 for the stationary thrust bearing member, and one or more suitable passages 17 are formed therein to permit the oil to flow from the body of the oil in the well to the inner periphery of the stationary bearing member 4. Suitable openings 45 are formed in the ring 16 to permit the return of the oil to the well 14.

An auxiliary oil reservoir 18, of generally channel shaped formation, is suitably attached, as by the bolts or screws 19, to the under side of the support 12, and the shell 10 has a depending flange 20 which carries a viscosity pump ring 21, with which cooperates a flanged ring 22 suitably carried by the shaft 1, as by means of a threaded sleeve 23. A solid shaft 24 is shown as suitably keyed within the hollow shaft 1. The viscosity pump 21 raises the oil from the auxiliary oil reservoir 18 and delivers it through one or more passages 25 to the lower end of the steady bearing 26. The oil after passing through the steady bearing flows over the top of an oil retaining ring 27, suitably secured to the channel ring 16, and joins the body of oil circulating through the thrust bearing and openings 45 in ring 16. The oil is returned to the auxiliary reservoir 18 from the main oil well in the pot or housing 14 through one or more suitable passages 28 shown as formed in the pot 14 and the support 12. In order that only cool oil shall overflow into the auxiliary reservoir 18, the passages 28 are shown as communicating with a riser pipe 29 which is surrounded by a second pipe 30 the interior of which communicates with the body of the oil in the well through apertures 31 in the bottom thereof. Hence only oil adjacent the bottom of the oil well, which has received the cooling action of a cooling coil 32, can enter the pipe 30 and rise therein to overflow into the pipe 29 and thereby return through the passages 28 to the auxiliary reservoir 18.

It will be noted that the auxiliary reservoir 18 acts as an expansion tank for the upper reservoir, since the oil level in the upper reservoir is maintained constant as indicated by the dotted line 14′, and the level in the lower reservoir, as indicated by the dotted line 18′, may rise on expansion of the oil or lower on evaporation of the oil. The upper reservoir acts as the cooling housing for the oil, by means of the circulation of a cooling medium through the coil 32, and there is a constant circulation of oil between the upper and the lower reservoirs when the bearing is in operation. Since, however, the level of the oil in the upper reservoir can never fall below the top of the tube 29, it is apparent that the thrust bearing surfaces 3 are constantly immersed to a fixed depth in the oil.

In the form shown in Fig. 2 the steady bearing 26 is again positioned within and below the thrust bearing elements 3 and 4, and is carried by a support 12 secured to the underside of the pot 14 and positioned within the aperture 13 thereof. In place of a viscosity pump, as in the embodiment of Fig. 1, the raising of the oil to the steady bearing 26 is effected by a rotating bowl 35 of any suitable construction, shown as retained on the shaft 1 by an annular nut 36 and provided with an overhanging flange 37. The shell 10 of the steady bearing is provided with a downwardly extending flange 38 which terminates in a radially extending flange 39 which projects into close proximity to the inner periphery of the outer wall of the bowl 35. Flange 39 has one or more inwardly directed passages 40 which communicate with one or more axial passages 41 in the flange 38, whereby the oil is led through one or more passages 42 to the steady bearing surfaces. The passages 40, 41 and 42 thus take the oil from the inner periphery of the outer wall of the rotating bowl, where the oil is thrown by centrifugal force, and lead the same to the steady bearing surfaces by reason of the pressure generated by that force. After passing through the steady bearing the oil flows over the top of an oil retaining ring 27 which in this case is suitably secured to the shell 10 of the steady bearing, and joins the oil flowing through the thrust bearing and into the cooling reservoir 14 through openings 45. The oil returns to the rotating bowl as in the embodiment of Fig. 1, the return passages in the support 12 and steady bearing shell 10 being shown at 43. Equalizing passages 44 are formed through the depending flange 38 of the steady bearing shell so that the pressure is equalized on the two sides of the same. To enable the bowl to be assembled after the flange 40 is in position, said bowl is preferably made in halves secured together in any suitable way.

It will be noted that in this modification also the bowl 35 acts as an expansion tank for the upper reservoir 14, so that the level 14′ of the oil in the reservoir 14 is maintained constant in order to secure constant lubrication of the thrust bearing members. The level 35′ of the oil in the expansion bowl 35 will assume a parabolic surface when the bearing is in operation, but the radial openings 40 in the flange 39 are so located that they are always in the deepest part of the body of oil in said bowl.

The remaining elements of the structure illustrated in Fig. 2 are analogous to the correspondingly numbered elements in Fig. 1, and it is therefore deemed unnecessary to describe the same particularly with reference to this embodiment of the invention.

In place of a riser pipe as illustrated in Figs. 1 and 2, the return of the oil to the auxiliary reservoir or bowl 35 may be effected through one or more suitable passages formed in the support 12, but preferably communicating with the main oil well adjacent the bottom thereof so as to assure that the oil overflowing into the auxiliary reservoir or bowl shall be taken from the coolest body of oil in the main oil well.

In Fig. 3 of the drawings is shown an embodiment of the present invention employing a stationary thrust collar 80 carried by a stationary shaft 81 mounted on the base 82 of a pot or oil well 83 of any suitable construction and shown as including a cooling coil 84. The thrust bearing is here illustrated as a double acting bearing, although a single acting thrust could be employed if desired, and includes bearing members 85 of any suitable construction cooperating with opposed faces of the collar 80 and shown as shoes pivotally mounted on equalizing plates 86 carried by channel-shaped base rings 87 suitably secured to a casing 88. The shoes 85 may obviously be made the stationary bearing elements by suitably mounting them on the stationary shaft 81, and the collar 80 may then be made the rotatable bearing member by dividing it into a pair of collars mounted in the casing 88 one above and one below the stationary shoes. This reversal of parts has the advantage of relieving the shoes from centrifugal force and thus increasing their freedom for tilting action.

Casing 88 is suitably attached, as by bolts or screws 89, to a flange or head 90 suitably keyed or secured to a rotatable shaft 91. Hence the thrust bearing members 85, together with their supports and the casing 88 carrying the latter, rotate with the shaft. Casing 88 has an axial extension 92 which supports the steady bearing shell 93, and hence, as in the embodiment heretofore described, the steady bearing is supported in unitary relationship with the thrust bearing and its support is entirely independent of the size, shape and character of the pot 83.

As the casing 88 rotates with the shaft 91, the oil within the same is thrown radially outward, by centrifugal force, against the inner periphery of the outer wall of said casing, thus assuming an approximately parabolic surface as in the auxiliary reservoir 35 of Fig. 2. The periphery of the stationary thrust collar 80 is in close proximity to the inner wall of said casing, and said thrust collar is provided with one or more inwardly directed passages 94 which lead from the periphery of said collar to axially extending passages 95 in the shaft 81. The latter passages communicate through the base 82 with conduits 96 through which, and the pipes 97 which open into the oil well adjacent the bottom thereof, the oil is returned to the oil well. The oil rises through the cooling coil 84 and overflows into passages 98 and 99 formed in the base 82. The passage 98 communicates through a passage 100 with an oil groove 101 at the upper extremity of the steady bearing, while the passage 99 communicates with a passage 102 in the stationary shaft 81 leading to the chamber at the inner periphery of the thrust bearing members. Thence the oil delivered thereto flows outwardly under the action of centrifugal force, induced by the rotation of the thrust bearing members 85, to form the oil film and to be subjected to pressure at the outer end of the passages 94. Hence a continuous circulation of oil is maintained between the rotatable casing 88 for the thrust bearing members and the oil well 83, on the one hand, and between the oil well and the steady bearings, on the other hand, the oil which flows through the steady bearing joining the oil in casing 88. The rotation of the bearing members 85 and the housing 88 is productive of considerable pressure, generated by centrifugal force, at the inlet to the passages 94, and if desired this pressure may be utilized to cause the oil to circulate through any suitable cooling passages, or between baffle plates, as well as through an oil well containing a cooling coil as illustrated.

In this embodiment the housing 88 acts as the expansion tank for the upper reservoir 83, and the level 83' of the oil in the upper reservoir is maintained constant. It will further be noted that the parabolic form of the free surface of the oil in the expansion tank 88 ensures the adequate lubrication of the thrust bearing members within said tank so long as a reasonable quantity of oil remains within said expansion tank.

This last embodiment of the invention permits a steady bearing of the smallest possible diameter to be used, a feature of very considerable importance in high speed bearings. The cooling of the bearing members may be additionally facilitated by providing the casing 88 with ribs so that air circulation generated by the rotation of said casing will assist in the dissipation of heat.

It will be perceived that a combined thrust and steady bearing has been provided wherein the support for the steady bearing is entirely independent of the size and shape of the pot or bearing housing, but may be determined by the size of the thrust bearing, so that the support for the steady bearing may be standardized and the steady bearing and the thrust bearing may be furnished as a unit, while the lubrication of the steady bearing may be effected in various ways and by means variously disposed with respect to the bearing elements. Moreover, the steady bearing, either with or without the lubricating features heretofore disclosed, may be disposed either above or below the thrust bearing.

The invention may also be embodied in structures wherein the thrust collar is rotatable or stationary, and wherein the shaft is either solid or hollow. While a number of embodiments of the invention have been shown and described in detail, it is to be expressly understood that the illustrated embodiments are not exclusive, as various other embodiments will now readily suggest themselves to those skilled in the art, while changes may be made in the details of construction, arrangement and proportion of parts, without departing from the spirit of this invention. Reference is therefore to be had to the claims hereto appended for a definition of the limits of the invention.

What is claimed is:

1. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing and within an aperture therein, said support including a member unitarily associated with the thrust bearing members, and a shell for the stationary bearing of the steady bearing rigidly attached to said member.

2. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing and within an aperture therein, said support projecting below said base and including a member unitarily associated with the thrust bearing members, and a shell for the stationary member of the steady bearing detachably mounted upon said member.

3. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing, an auxiliary pot or housing, and means including passages in said support for conveying oil from said pot or housing to said auxiliary pot or housing.

4. In a combined thrust and steady bearing for a shaft provided with relatively rotatable thrust and steady bearing members, in combination with a pot or housing for the thrust bearing, a support for the stationary bearing member of the steady bearing mounted in an aperture in the base of said pot or housing.

5. In a combined thrust and steady bearing for a shaft provided with relatively rotatable thrust and steady bearing members, in combination with a pot or housing for the thrust bearing, a support for the stationary bearing member of the steady bearing detachably mounted on the base of said pot or housing and adapted to be withdrawn therefrom by movement below said pot or housing.

6. In a combined thrust and steady bearing for a shaft provided with relatively rotatable thrust and steady bearing members, in combination with a pot or housing for the thrust bearing, a support for the stationary bearing member of the steady bearing mounted on and insertible into the base of said pot or housing within and below the same whereby the steady bearing is below the thrust bearing.

7. In a combined thrust and steady bearing for a shaft provided with relatively rotatable thrust and steady bearing members, in combination with a pot or housing for containing the main body of lubricant in which the thrust bearing members are immersed, means for supporting the steady bearing below the thrust bearing, an auxiliary oil reservoir below said pot or housing, means for feeding oil from said auxiliary reservoir to the steady bearing, and means for supplying said auxiliary reservoir with oil from said pot or housing.

8. In a combined thrust and steady bearing for a shaft provided with relatively rotatable thrust and steady bearing members, in combination with a pot or housing for containing the main body of lubricant in which the thrust bearing members are immersed, means for supporting the steady bearing from the base of said pot or housing and below the thrust bearing, an auxiliary oil reservoir mounted on said pot or housing below the same, means in said auxiliary reservoir for feeding oil from said reservoir to the steady bearing, said steady bearing delivering the oil to said pot or housing, and means for conveying coal oil from said pot or housing to said auxiliary reservoir.

9. In a combined thrust and steady bearing for a shaft provided with relatively rotatable thrust and steady bearing members, in combination with a pot or housing for the thrust bearing, means for supporting the steady bearing below the thrust bearing, an auxiliary oil reservoir below said pot or housing including a rotatable bowl, and means for feeding oil from said bowl to said steady bearing.

10. In a combined thrust and steady bearing for a shaft provided with relatively rotatable thrust and steady bearing members, in combination with a pot or housing for the thrust bearing, means for supporting the steady bearing from the base of said pot or housing and below said thrust bearing, an auxiliary oil reservoir below said pot or housing and including a rotatable bowl, passages whereby the pressure in the oil in said bowl generated by centrifugal force causes the oil to feed to and through said steady bearing, and means for returning oil to said bowl from said pot or housing.

11. In a combined thrust and steady bearing, a stationary thrust collar, a stationary shaft on which said collar is mounted, rotatable thrust and steady bearing members cooperating with said collar and shaft respectively, and a member for mounting the rotatable thrust and steady bearing members as a unit.

12. In a combined thrust and steady bearing, in combination with an oil well, a stationary thrust collar, a stationary shaft on which said collar is mounted, rotatable thrust and steady bearing members cooperating with said collar and shaft respectively, a member for mounting the rotatable thrust and steady bearing members as a unit, said last named member constituting an oil reservoir for the thrust bearing, and means for circulating oil between said oil well and said reservoir.

13. In a combined thrust and steady bearing, a stationary thrust collar, a stationary shaft on which said collar is mounted, rotatable thrust and steady bearing members cooperating with said collar and shaft respectively, a member for mounting the rotatable thrust and steady bearing members as a unit, said last named member constituting a housing for said thrust and steady bearing members, and means for circulating oil to and from said thrust and steady bearing members.

14. In a combined thrust and steady bearing, a stationary thrust collar, a stationary shaft on which said collar is mounted, rotatable thrust and steady bearing members cooperating with said collar and shaft respectively, a member for mounting the rotatable thrust and steady bearing members as a unit, said last named member constituting an oil retaining housing for the thrust and steady bearings, and means whereby the centrifugal force induced in the oil by the rotation of said housing effects a circulation of oil to and from said steady bearing and said thrust bearing.

15. In a combined thrust and steady bearing, in combination with an oil well, a stationary thrust collar, a stationary shaft on which said collar is mounted, rotatable thrust and steady bearing members cooperating with said collar and shaft respectively, a member for mounting the rotatable thrust and steady bearing members as a unit, said last named member constituting a housing for said thrust and steady bearing members, and passages in said collar and shaft for conveying oil between said housing and oil well.

16. In a combined thrust and steady bearing, in combination with an oil well, a stationary thrust collar, a stationary shaft on which said collar is mounted, rotatable thrust and steady bearing members cooperating with said collar and shaft respectively, a member for mounting the rotatable thrust and steady bearing members as a unit, said last named member constituting a housing for said thrust and steady bearing members, and passages in said collar and shaft whereby oil is led to said steady bearing and said thrust bearing from said oil well and returned to said well by reason of the centrifugal action of the oil in said housing.

17. In a combined thrust and steady bearing for a shaft, relatively movable thrust and steady bearing members, a fixed support for the stationary thrust and steady bearing members, a support for the rotatable thrust and steady bearing members, a main oil reservoir adapted to be maintained at a constant level, one of said supports being adapted to provide an auxiliary overflow reservoir, and means associated with said supports cooperating to cause the circulation of oil through the bearings and reservoirs.

18. In a combined thrust and steady bearing for a shaft, relatively movable thrust and steady bearing members, a fixed support for the stationary thrust and steady bearing members, a support for the rotatable thrust and steady bearing members, a main oil reservoir adapted to be maintained at a constant level, one of said supports being adapted to provide an auxiliary overflow reservoir below the main reservoir, and means associated with said supports cooperating to raise the oil from the auxiliary oil reservoir and cause it to flow to the main reservoir.

19. In a combined thrust and steady bearing for a shaft, relatively movable thrust and steady bearing members, a fixed support for the stationary thrust and steady bearing members, a support for the rotatable thrust and steady bearing members, a main oil reservoir adapted to be maintained at a constant level, said rotatable support being adapted to provide an auxiliary overflow reservoir, and said supports having cooperating means whereby oil is fed to the steady bearing surfaces and thence to said main reservoir by relative rotation of said supports.

20. In a combined thrust and steady bearing for a shaft, relatively movable thrust and steady bearing members, a fixed support for the stationary thrust and steady bearing members, a support for the rotatable thrust and steady bearing members, a main oil reservoir having a constant level overflow outlet, said rotatable support being adapted to provide an auxiliary reservoir below the main reservoir and adapted to receive the overflow therefrom, and said supports having cooperating means whereby oil is fed to the steady bearing surfaces by relative rotation of said supports.

21. In a combined thrust and steady bearing for a shaft, relatively movable thrust and steady bearing members, a fixed support for the stationary thrust and steady bearing members, a support for the rotatable thrust and steady bearing members, a main oil reservoir having a constant level overflow outlet, said fixed support being adapted to provide an auxiliary reservoir below the main reservoir and adapted to receive the overflow therefrom, and said supports having cooperating means whereby relative rotation of the supports causes oil to be fed to the bearing surfaces thereof.

22. A lubricating system for a shaft having relatively rotatable bearing members comprising a main reservoir adapted to supply oil to said bearing under a constant head, an auxiliary oil reservoir below said main reservoir adapted to receive the overflow from the main reservoir, and means in said auxiliary reservoir, actuated by the relative rotation of the bearing members, for causing a return flow of oil from said auxiliary reservoir to said main reservoir.

23. A lubricating system for a shaft having relatively rotatable bearing members comprising a main reservoir adapted to supply oil to said bearing under a constant head, cooling means in said reservoir, an auxiliary oil reservoir located below the main reservoir and adapted to receive the overflow of cool oil therefrom, and means in said auxiliary oil reservoir actuated by the relative rotation of the bearing members for raising a stream of oil from said auxiliary reservoir and returning it to the main reservoir.

24. In a combined thrust and steady bearing for a shaft, relatively rotatable bearing members, a stationary reservoir for lubricant adapted to be maintained at a constant level, a rotatable housing for the bearing members, and means rendered effective by rotation of said housing for circulating lubricant between said reservoir and housing.

25. In a combined thrust and steady bearing for a shaft, relatively rotatable bearing members, a stationary reservoir for lubricant adapted to be maintained at a constant level, a rotatable housing for the bearing members located below said reservoir and adapted to provide an auxiliary overflow reservoir, and means rendered effective by rotation of said housing for circulating lubricant between said reservoir and housing.

26. A combined thrust and steady bearing for a shaft comprising fixed and rotatable bearing members, a stationary reservoir for lubricant adapted to be maintained at a constant level, a rotatable housing in which the rotatable bearing members are mounted, and a fixed support for the stationary bearing members, said housing and support cooperating to circulate lubricant between said reservoir and housing and through said bearings.

27. A combined thrust and steady bearing for a shaft comprising fixed and rotatable bearing members, a stationary reservoir for lubricant adapted to be maintained at a constant level and provided with lubricant cooling means, a rotatable housing located below said reservoir and adapted to provide auxiliary overflow reservoir in which the rotatable bearing members are mounted, and a fixed support for the stationary bearing members within said housing, said housing and support cooperating to pump lubricant from said housing to said reservoir.

28. A combined thrust and steady bearing for a shaft comprising fixed and rotatable bearing members, a stationary reservoir for lubricant adapted to be maintained at a constant level and provided with lubricant cooling means, a rotatable housing located below said reservoir and adapted to provide an auxiliary overflow reservoir in which the rotatable bearing members are mounted, and a fixed support for the stationary bearing members within said housing, said housing and support cooperating to raise lubricant from the housing to the support, and means for feeding cooled lubricant from said reservoir to said bearings.

In testimony whereof I have signed this specification.

HARRY A. S. HOWARTH.